United States Patent
Shpeisman et al.

(10) Patent No.: US 8,612,950 B2
(45) Date of Patent: Dec. 17, 2013

(54) DYNAMIC OPTIMIZATION FOR REMOVAL OF STRONG ATOMICITY BARRIERS

(75) Inventors: Tatiana Shpeisman, Menlo Park, CA (US); Vijay Menon, Seattle, WA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 936 days.

(21) Appl. No.: 12/142,102

(22) Filed: Jun. 19, 2008

(65) Prior Publication Data

US 2009/0319739 A1 Dec. 24, 2009

(51) Int. Cl.
*G06F 9/45* (2006.01)

(52) U.S. Cl.
USPC ............ 717/151; 717/153; 717/155; 717/156

(58) Field of Classification Search
USPC ........... 717/151, 153, 155, 156; 711/158, 154
See application file for complete search history.

(56) References Cited

U.S. PATENT DOCUMENTS

| 5,893,165 | A * | 4/1999 | Ebrahim | 711/158 |
| 2009/0235254 | A1* | 9/2009 | Michael | 718/101 |

\* cited by examiner

*Primary Examiner* — Qamrun Nahar
(74) *Attorney, Agent, or Firm* — Hanley, Flight & Zimmerman, LLC (57) ABSTRACT

A method and apparatus for dynamic optimization of strong atomicity barriers is herein described. During runtime compilation, code including non-transactional memory accesses that are to conflict with transactional memory accesses is patched to insert transactional barriers at the conflicting non-transactional memory accesses to ensure isolation and strong atomicity. However, barriers are omitted or removed from non-transactional memory accesses that do not conflict with transactional memory accesses to reduce barrier execution overhead.

24 Claims, 8 Drawing Sheets

| data field | Tx access sate | Access ID |
|---|---|---|
| Ld A.w | Not-accessed | S1 |
| Ld A.x | Not-accessed | S2 |
| Ld A.y | Not-accessed | S3 |
| Str A.z | Not-accessed | S4 |

610

| data field | Tx access sate | Access ID |
|---|---|---|
| Ld A.w | Read Only | S1 |
| Ld A.x | Not-accessed | S2, S5 |
| Ld A.y | Read-Write | S3 |
| Str A.z | Read-Only | S4 |

FIG. 6

```
class A {              void foo (A a1) {        void bar (A a2) {
int w;                 S1: int t0 = a1.w;       S5: a2.x = 1;
int x;                 S2: int t1 = a1.x;       atomic {
string y;              S3: String t2 = a1.y;            S6: int t4 = a2.w;
object z;              S4: a1.z = t2;                   S7: a2.y = "Hello";
};                     }                                S8: Object t5 = a2.z;
                                                }
                                        }
```

FIG. 6A

DYNAMIC OPTIMIZATION FOR REMOVAL OF STRONG ATOMICITY BARRIERS

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously has created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes a Software Transactional Memory (STM), where tracking of memory accesses, conflict resolution, abort tasks, and other transactional tasks are performed in software.

In weakly atomic transactional memory systems, only transactional accesses are isolated from each other. In such systems non-transactional memory accesses are not tracked and, thus, do not incur any additional transactional overhead. However, weakly atomic systems do not provide general isolation and ordering guarantees for programs that mix transactional and non-transactional accesses to the same data which may potentially lead, in some cases, to incorrect execution as a result of conflicting transactional and non-transactional accesses that are not isolated from one another.

In contrast, in strongly atomic transactional memory systems, to ensure runtime conflicts between transactional memory operations and non-transactional memory operations do not occur, compilers treat each non-transactional memory operation as a single operation transaction. In other words, transactional barriers are inserted at non-transactional memory accesses to isolate transactions from these non-transactional memory accesses. Here, the potential incorrect execution due to conflicts between transactional and non-transactional accesses is avoided; yet, execution of transactional barriers at every non-transactional memory operation potentially wastes execution cycles.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware/software support for transactional execution, specific shared memory access tracking, specific locking/versioning/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, transaction hardware, cache organizations, specific compiler methods/implementations, and specific operational details of microprocessors, have not been described in detail in order to avoid unnecessarily obscuring the present invention.

The method and apparatus described herein are for providing dynamically optimized barriers for strong atomicity in code. Specifically, dynamic optimization of barriers is primarily discussed in reference to an illustrative Software Transactional Memory system (STM). However, the methods and apparatus for optimizing barriers for strong atomicity are not so limited, as they may be implemented in associated with any transactional memory system.

Figure 1:
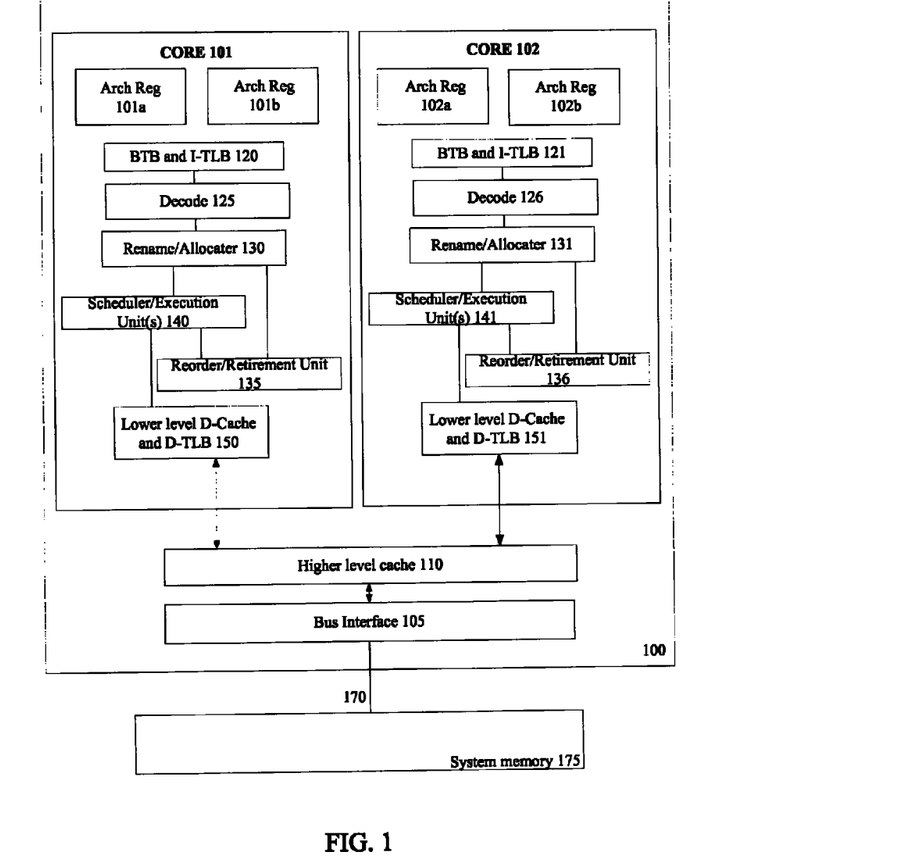
FIG. 1 illustrates an embodiment of a processor including multiple processing elements capable of executing multiple software threads.

Referring to FIG. 1, an embodiment of a processor capable of both execution of code to dynamically optimize barriers for strong atomicity and execution of optimized strong atomicity code is illustrated. Processor 100 includes any processor, such as a micro-processor, an embedded processor, a digital signal processor (DSP), a network processor, or other device to execute code. Processor 100 includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101*a* and 101*b*, while core 102 includes two hardware threads 102*a* and 102*b*. Therefore, software entities, such as an operating system, potentially view processor 100 as four separate processors, i.e. four processors capable of executing four software threads.

Here, a first thread is associated with architecture state registers 101*a*, a second thread is associated with architecture state registers 101*b*, a third thread is associated with architecture state registers 102*a*, and a fourth thread is associated with architecture state registers 102*b*. As illustrated, architecture state registers 101*a* are replicated in architecture state registers 101*b*, so individual architecture states/contexts are capable of being stored for logical processor 101*a* and logical processor 101*b*. Other smaller resources, such as instruction pointers and renaming logic in rename allocator logic 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of exemplary functional units/resources of a processor is illustrated. Note that a processor may include, or omit, any of these functional units, as well as include any known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of transactional execution. A transaction, which may also be referred to as a critical or atomic section of code, includes a grouping of instructions, operations, or micro-operations to be executed as a group. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendency of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Software Transactional Memory (STM) system often refers to performing access tracking, conflict resolution, or other transactional memory tasks in or at least partially in software. As a general example, a compiler, when executed, compiles program code to insert calls to read and write barriers for transactional load and store operations, accordingly. A compiler may also insert other transactional and non-transaction related operations, such as commit operations, abort operations, bookkeeping operations, conflict detection operations, and strong atomicity operations.

As stated above, in previous strong atomicity transactional systems, non-transactional memory access operations are treated as single instruction transactions. Here, a compiler inserts read and write barriers at every non-transactional memory access to ensure strong atomicity, i.e. to isolate transactional memory accesses from non-transactional memory accesses. As an example, a call to a write barrier is inserted at every non-transactional write operation. In this example, a provided write barrier, when called, is to perform operations to ensure isolation, such as performing a lock acquire operation/function to acquire a lock for a memory location and a lock release operation/function to release a lock for a memory location. However, performing these barrier operations at every non-transactional memory access is potentially expensive and unnecessary.

Therefore, in one embodiment, transactional barriers are dynamically optimized for removal of unnecessary transactional barriers from non-transactional memory access operations, while providing strong isolation and atomicity guarantees. In one embodiment, it is dynamically determined if a memory location associated with a non-transactional memory access operation may be conflictingly accessed within a transaction. In one embodiment, conflicting accesses include memory accesses where at least one of the memory accesses is a write, such as a transactional write to a memory location to be loaded by a non-transactional load operation. Here, a transactional read of a memory location to be read by a non-transactional operation does not constitute a conflict as neither accesses are updating the memory location.

If a compiler concludes that the non-transactional access cannot conflict with any transactional access, then it does not generates a transactional barrier at the non-transactional memory access. Here, by convention of the program design, the non-transactional memory access is isolated from transactional memory accesses, i.e. the memory location is not accessed in a transaction. As a consequence, no transactional barrier is inserted, which results in optimized barrier execution overhead. Alternatively, if a non-transactional access may conflict with a transaction, then the appropriate transactional barriers are inserted to provide strong atomicity for avoiding incorrect execution. If later, a compiler encounters a transactional access that may conflict with the non-transactional access for which no barrier was previously generated, a compiler will modify the generated code to contain the barrier (for example, via patching).

In one embodiment, the dynamic analysis described above occurs during runtime compilation of code, such as in a managed runtime environment. Therefore, different portions of code may be individually compiled on multiple processing elements of processor 100. For example, a first portion of code including a non-transactional load operation is compiled on core 101, while a second portion of the code including a transactional store operation that is to conflict with the non-transactional load operation is being compiled on core 102.

Figure 2:
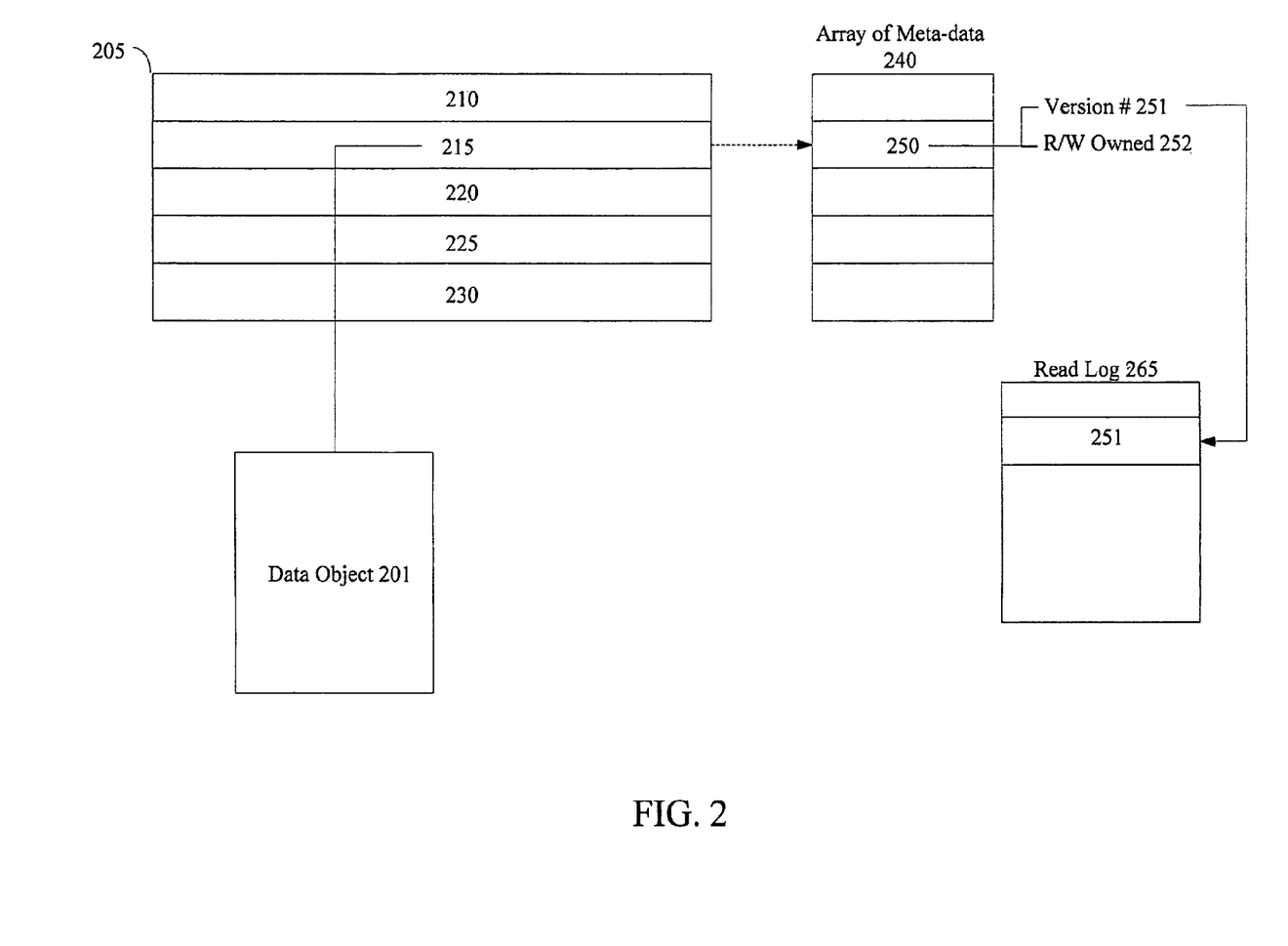
FIG. 2 illustrates an embodiment of structures to support transactional execution.

Referring to FIG. 2, a simplified illustrative embodiment of a S™ system is depicted. In one embodiment of an STM, transactional barriers, such as read and write barriers, are utilized to ensure data consistency during memory access operations. As above, these barriers, when executed, are to perform similar transactional tasks, such as detecting invalidating accesses. In other words, transactional barriers perform bookkeeping to ensure isolation and data validity.

In one embodiment, memory locations, such as data object 201 held in cache line 205, are associated with meta-data locations, such as meta-data location 250 in array 240. Here, when a memory location, such as data object 201 held in cache line 215 is unlocked, meta-data location 250 holds a version value, i.e. a version number of data object 201.

In another embodiment, which is not depicted, alternative methods for mapping meta-data to data elements or objects are utilized. For example, data element 201 potentially includes a data object with any number of object fields. Here, meta-data, such as location 250, is held in a field of the object or a header of the object. As an example, meta-data held in a header of an object is utilized as meta-data for all the object fields within the object. Therefore, although the description of FIG. 2 primarily focuses on cache line conflict detection in a managed environment, such as C/C++, the methods and apparatus described herein may be utilized in any transactional memory system, such as in an object based conflict detection system in an unmanaged environment.

As an illustrative example, a read barrier logs a previous version value 251 in read log 265 upon a load of data object 201. As a result, later this pervious version value may be utilized to determine if data object 201 was updated during execution of the transaction, i.e. a current version value held in meta-data location 250 is different from previous logged version value 251.

Continuing the example, when a memory location is owned, meta-data location 250 holds a locked value 252, such as a generic locked value or a pointer to a transaction descriptor indicating which transaction or processing element owns the memory location. Here, a write barrier may acquire the lock before writing to the location, i.e. update meta-data location 250 to owned value 252. Note that the versioning scheme above is discussed in reference to an optimistic read STM, where lighter weight read barriers, i.e. version logging, are performed for reads, and more extensive write-barrier operations, i.e. acquiring a lock, are performed for writes. However, read and write barriers are not so limited, as writes may be performed more optimistically in different STM implementations.

Also note that the aforementioned tasks to be performed by execution of read and write barriers are purely illustrative, as any bookkeeping, versioning, or other task to be performed upon a read or write in association with transactional execution may constitute a transactional barrier. A non-exhaustive exemplary list of typical barrier tasks include: determining if a location is owned, acquiring a lock, performing a buffer related task, performing on-demand version validation, and logging values. Furthermore, read and write barriers may be updated and optimized to perform different or optimized tasks. As an example, code may include a patch or call to a transactional barrier, which resides in a provided library. The provided library may be updated to update the transactional barrier without affecting the original code.

In one embodiment, a dynamic not accessed in a transaction (D-NAIT) optimization is performed to optimize transactional barriers for non-transactional memory accesses to provide efficient strong atomicity. Here, transactional memory accesses are performed utilizing read and write barriers, such that transactions are isolated from each other. Furthermore, non-transactional accesses that access memory locations that are accessed within transactions are also performed utilizing read and write barriers to isolate them from transactional accesses. However, non-transactional memory accesses to memory locations that are not accessed in transactions are not performed utilizing read and write barriers to reduce overhead without sacrificing strong atomicity.

The examples above includes one embodiment of implementing an STM; however, any known implementation of a transactional memory system may be utilized in conjunction with dynamic optimization of transactional barriers for strong atomicity, such as an STM, an Unbounded Transactional Memory (UTM) system, a hybrid Transactional Memory system, such as a hardware accelerated STM (HASTM), or any other transactional memory system.

Figure 3:
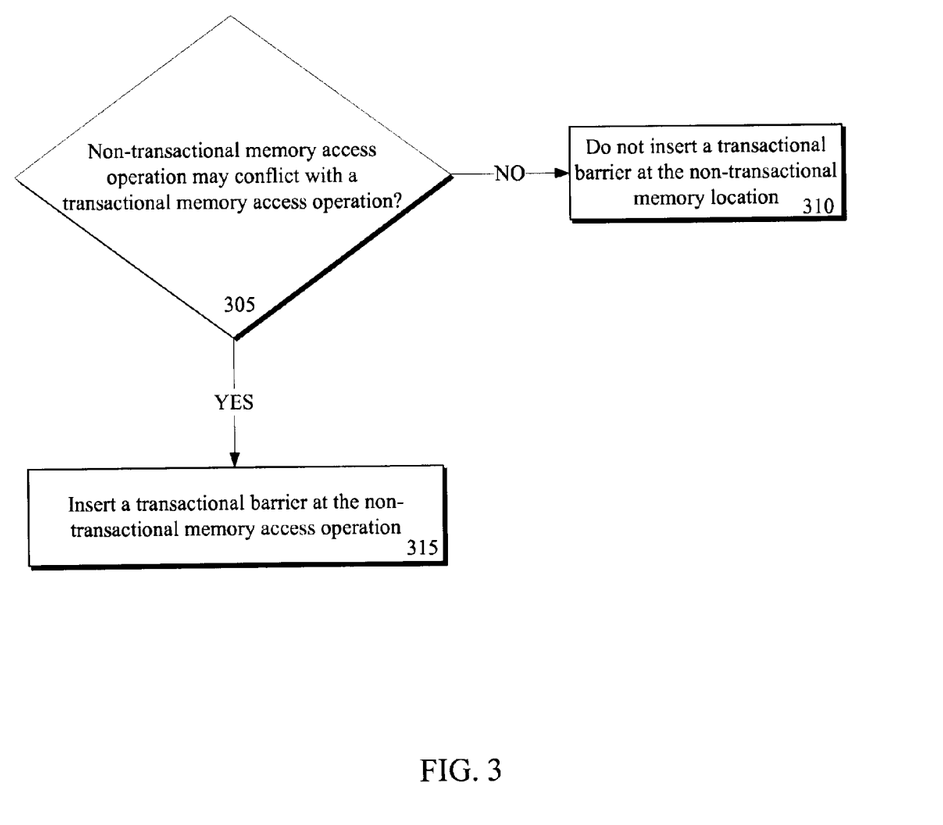
FIG. 3 illustrates an embodiment of a flowchart for a method of providing optimized strong atomicity in transactional systems.
Figure 4:
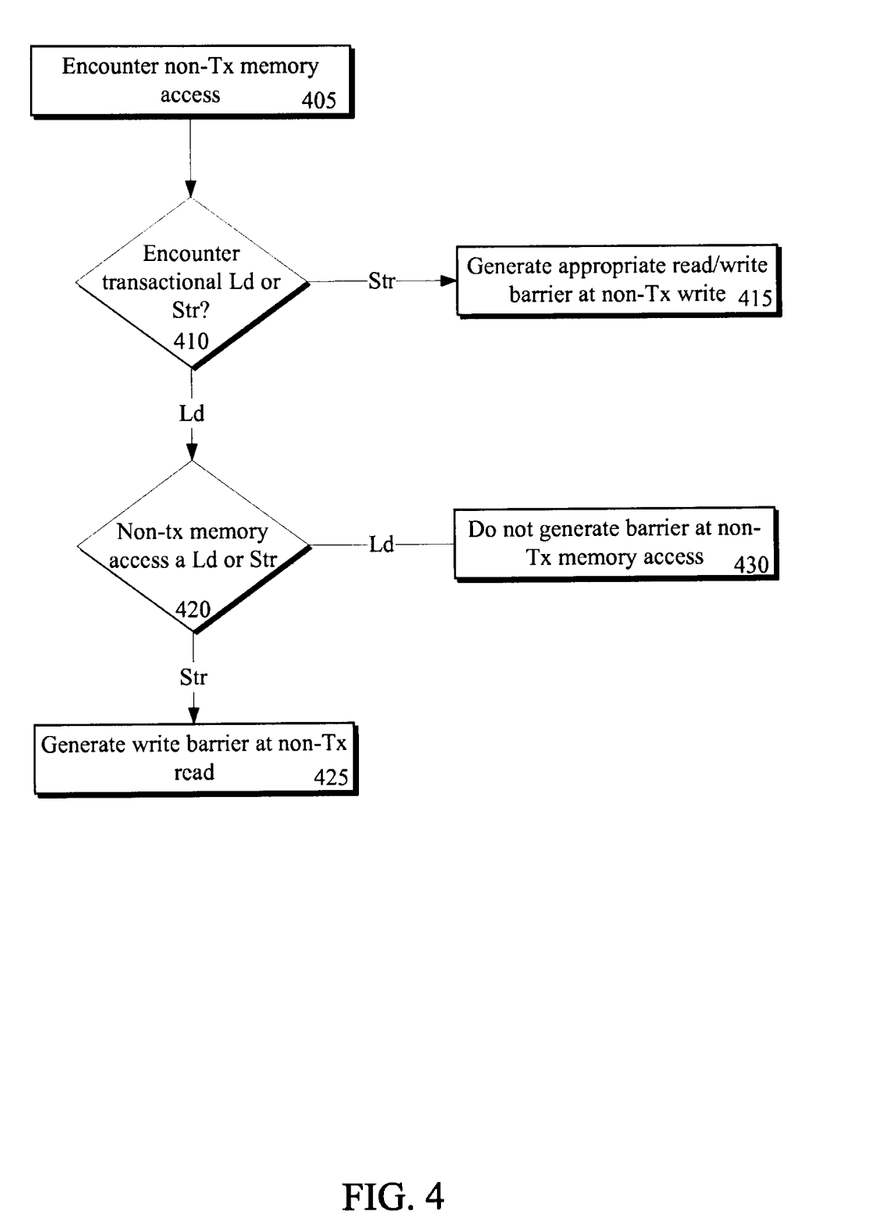
FIG. 4 illustrates an embodiment of a flow chart for a method of optimizing barriers for a strong atomicity transactional memory system.
Figure 5A:
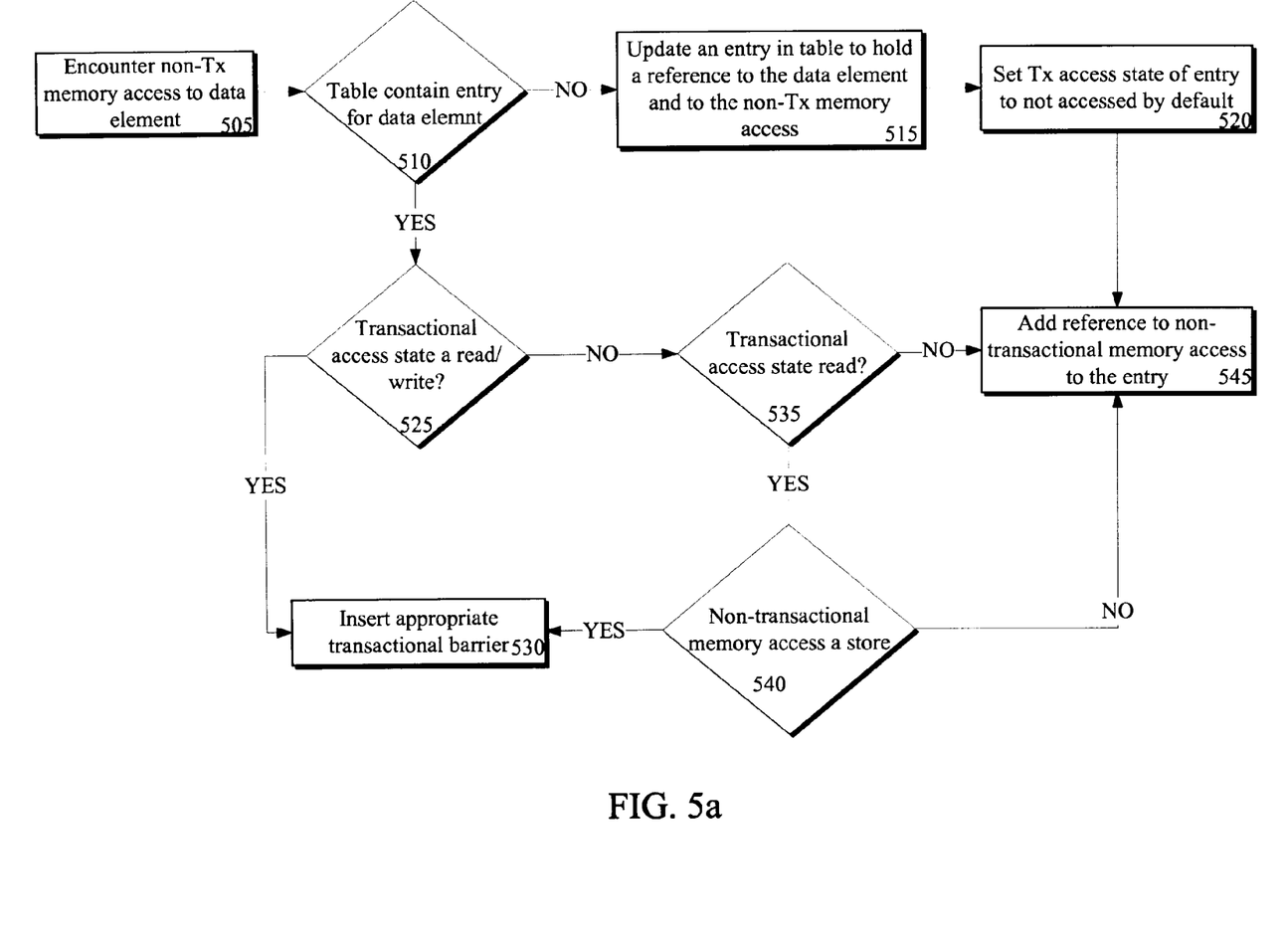
FIG. 5a illustrates another embodiment of a flowchart for a method of optimizing barriers for a strong atomicity transactional memory system upon encountering a non-transactional memory access.
Figure 5B:
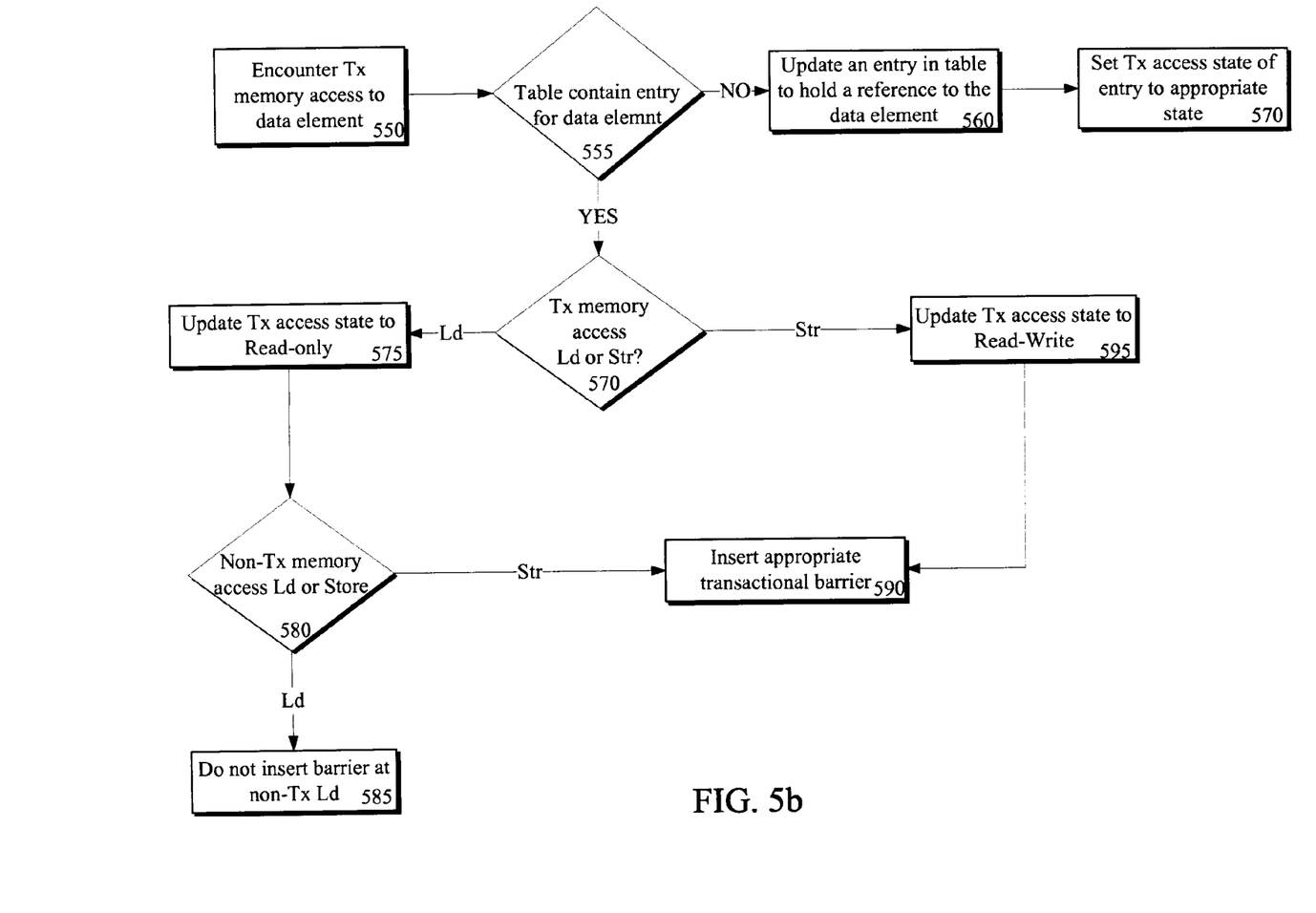
FIG. 5b illustrates another embodiment of a flowchart for a method of optimizing barriers for a strong atomicity transactional memory system upon encountering a transactional memory access.

Referring next to FIG. 3, an embodiment of a flowchart for a method of providing optimized strong atomicity in transactional systems is illustrated. Note the flowcharts of FIGS. 3-5 are illustrated in a substantially serial fashion. However, the methods illustrated by these Figures are not so limited, as they may occur in any order, as well as being performed at least partially in parallel. For example, in FIG. 5a, an access may be added to a list in an entry in block 545 before updating a transaction access state of the entry in block 520.

Referencing FIG. 3, in block 305 it is dynamically determined if a non-transactional memory access operation may conflict with a transactional memory access operation. Previously, whole program static analysis may be utilized to analyze transactional code. In one embodiment, dynamic analysis/determination includes analysis during runtime compilation of code. For example, some dynamic loading languages, such as Java™ from Sun Microsystems Inc, utilize runtime compilation to load and execute portions of code. As a result, these dynamic languages are capable of being abstracted over multiple types of physical hardware by compiling code at runtime to be interpreted correctly by hardware.

Although dynamic analysis is referred to above, in one embodiment, as analysis during runtime compilation of code, dynamic analysis, in another embodiment, includes any partial program analysis. Often, during runtime, a dynamic language analyzes each method, such as via a linear scan, utilizing a recompilation infrastructure, as discussed above. However, in this discussion is inherent that only portions of code/programs are available to a dynamic language compiler during compilation. As a result, dynamic determination in one embodiment may include non-runtime compilation partial program analysis.

During dynamic analysis, the compiler, such as a runtime dynamic language compiler, is to determine if a non-transactional memory access operation may conflict with a transactional memory access operation. In one embodiment, encountering any transactional memory access operation and non-transactional memory access operation that is to read from or write to the same data is determined to be conflicting accesses.

Here, note that a conflict may not be equivalent to an invalidating access as commonly referred to in transactional memory; however, conflicting accesses may result in an invalidating access. In transactional memory, an invalidating access often refers to an actual invalidating access, such as a write to a memory location that is loaded from during a pendency of a transaction. In contrast, conflicting accesses, in one embodiment discussed herein, refers to a potential for accesses to be invalidating accesses. For example, during dynamic compilation a non-transactional write to a memory location may is encountered and a transactional load from the memory location is also encountered, which results in conflicting accesses. However, during actual execution, the non-transactional write may occur outside of the transaction, which does not result in an invalidating access. Therefore, as can be seen, these conflicting accesses exhibit a potential for being invalidating; however, when they are executed they may not be invalidating.

In some transactional memory systems, such as optimistic read concurrency systems, reads/loads are performed optimistically, while more bookkeeping is performed in regards to writes and stores. Consequently, in one embodiment, a transactional load to read a memory location that is also to be read by a non-transactional load operation are not determined to be conflicting accesses. Here, since both access operations only read from a memory location, there is no potential for invalid execution from incorrect data, as the memory location is not modified by either memory access operation. However, as an example, if either of the non-transactional or transactional memory access operations to the same location includes a store operation, then the accesses are to be considered conflicting.

In the discussion above, conflicting accesses were discussed in reference to the same memory location, or in other words, modification of the same data. Therefore, in one embodiment, any known method of determining whether a non-transactional memory access operation may access the same data as a transactional memory access operation may be utilized for determining if accesses are determined to be conflicting. Examples of other terms or references that are associated with the same data, or reference thereto, include a data element, a data object, a data reference, a field of a type of dynamic language code, a type of dynamic language code, a memory address to hold data, and a memory location to hold data.

A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to refer to the field x of object a of class A. For example, an expression may be couched as a.x=a.y+a.z. Here, field y and field z are loaded to be added and the result is to be written to field x.

Therefore, conflict determination may be performed at any of data level granularity. For example, in one embodiment, a conflict is detected at the type level. Here, a non-transactional write to a field A::x and a transactional load of field A::y is determined to be conflictingly accessed. In another embodiment, conflict determination/analysis is performed at a field level granularity. Here, a non-transactional write to A::x and a transactional load of A::y is not determined to be conflicting. Note, other data structures or programming techniques may be taken into account in conflict analysis. As an example, assume that fields x and y of object of class A, i.e. A::x and A::y, point to objects of class B, are initialized to newly allocated objects, and are never written to after initialization. In one embodiment, a non-transactional write to a field B::z of an object pointed to by A::x is not determined to be a conflicting access in regards to a transactional load of field B::z of an object pointed to by A::y.

In one embodiment, dynamic analysis of conflicting accesses is performed utilizing a memory access table. Here, a table is maintained during dynamic analysis, such as during runtime, to track whether conflicting non-transactional and transactional memory accesses are encountered. In one embodiment, as program code is compiled, the table is indexed with data referenced by encountered transactional and non-transactional memory accesses. Note that multiple data accesses may map to the same entry in the table. Each table entry is associated with a transaction access state. When a transactional access to data is encountered, the transaction access state of the appropriate data entry is updated accordingly.

In one embodiment, a table entry also holds a list of references to non-transactional memory accesses for which a compiler generated no barriers based on the transactional access state of the entry. This list of references is discussed in more detail below in reference to the discussion of an access identifier (ID) field.

As an example, during compilation when a non-transactional write to A::x is encountered, an entry of the memory access table is updated with the data reference, i.e. A::x, a default transaction access state of not accessed, and a reference to the non-transactional write, such as a statement location and/or method the non-transactional write is included within. Later, a transactional load of A::x is encountered. The transaction access entry associated with A::x of the table is updated to a read state to indicate that A::x is read in a transaction. Here, it is determined that the non-transactional write to A::x is to conflict with a transactional access, since the transaction access state includes a read state, i.e. a transaction is to load data that is to be written to by a non-transactional store.

Note that a conflict between transactional and non-transactional accesses may be detected either at a non-transactional memory access or at a transactional memory access, as discussed in the example above. Therefore, in one embodiment, determining a conflict exists, or a potential thereof, includes determining if a data element referenced by a non-transactional memory access is conflictingly accessed in a transaction upon encountering the non-transactional memory access.

As an example, upon encountering the non-transactional memory access, the table is searched utilizing the data element referenced by the non-transactional memory access, and if an associated entry is found, then a transactional access state of the entry is checked. Here, if the transactional access state indicates a potential conflict with the non-transactional memory access, then an appropriate barrier is generated at the non-transactional memory access in block 315, which is discussed in more detail below. However, if no conflict is detected at that time, then in one embodiment, no barrier is inserted at block 310. In another embodiment, a lightweight barrier or other space creating operations may be inserted instead of no barrier at the non-transactional memory access. As a first example of space saving operations, a no-op may be initially inserted at the non-transactional memory access to save space for later patching.

Furthermore, upon encountering a transactional memory access referencing a data element, a conflict may also be detected. Here, in one embodiment, a transactional access state associated with the data element is updated in the table in response to encountering the transactional memory access. As stated above, the table may include a list of references to related non-transactional memory access operations that were previously encountered with no barrier or a lightweight barrier inserted. As a result, in one embodiment, where no barrier is inserted at related non-transactional memory access operations, code is recompiled utilizing on-stack replacement to insert appropriate barriers in block 315. In another embodiment, where other operations or lightweight barriers were inserted, the code is patched in block 315.

Note that patching may include overwriting the non-transactional memory access operation with a jump operation, when executed, to direct execution flow to a call to a transactional barrier and a copy of the non-transactional memory access operation. Alternatively, lightweight barriers or space saving no-ops may be overwritten with operations to direct the execution flow to a barrier. In one embodiment, when transactional accesses are encountered that initiate a generation of a barrier at a previously encountered non-transactional operation, threads are halted at a safe point, such as a point that does not overlap with the operation being patched, and the patch is performed.

Although specific examples of patching and recompiling of code are discussed, inserting a transactional barrier at a previously encountered non-transactional access operation may be done by any known method.

In contrast to the discussion above, if no conflict is detected in decision block 305, then as illustrated in block 310, no transactional barrier is inserted or executed at the non-transactional memory access operation.

Turning to FIG. 4 an embodiment of a flowchart for a method of optimizing barriers for a strong atomicity transactional memory system is illustrated. In block 405 a non-transactional memory access operation, such as a load or store operation, is encountered. In one embodiment, by default, space may be reserved, as described above, for later insertion of a transactional barrier.

In one embodiment, upon encountering the non-transactional memory access operation, an entry in a global table is updated to hold information about a data element referenced by the non-transactional memory access operation associated with a transactional access state. In one embodiment, by default, when adding a new entry to the table, the transaction access state is updated to a not-accessed state, i.e. the data element is not accessed within a transaction. However, if the table already contains the entry for the data than the transactional access state of that entry is not modified.

Furthermore, if a transactional access to the data element is encountered before the non-transactional memory access, then an entry may have already been updated/created by the transactional access. Here, the data element may be associated with a transaction access state of read-only, i.e. the data element is read inside a transaction, or read-write, i.e. the data element is at least written to in a transaction. In this instance, an access identification (ID) field, which is to hold a list of references to non-transactional memory accesses to be updated in response to detecting a conflict, of the entry may be updated to also reference the non-transactional memory access. However, the transactional access state is not modified.

In one embodiment, not every non-transactional memory access operation is considered for conflict detection. In other words, in the example where a table is used for conflict analysis, an entry is not created for some non-transactional memory access operations. For example, non-transactional memory accesses to local thread data or other local temporary data elements that are not at risk from conflict with a transactional access, in this embodiment, are not considered for conflict detection. However, in other embodiment, this local data may be considered for conflict detection.

In block 410 a transactional access operation to access the data element referenced by the non-transactional memory access is encountered. Note, if no transactional access to the data element is encountered, then no barrier is generated, as in block 430. In block 410, it is determined if the transactional access includes a transactional load or a store. If the transactional access is a store operation, then the transaction access state is updated to a read-write state, i.e. the data element is at least written to in a transaction and may be read within the transaction as well. Consequently, a compiler inserts the appropriate read or write barriers at previously encountered non-transactional memory accesses that potentially conflict with the transactional store in block 415. These previously encountered non-transactional memory accesses, as discussed above, may be held in an entry of a table associated with the data element referenced by the transactional memory access.

Alternatively, if the transactional memory access includes a load operation, then, in one embodiment, barriers are inserted at non-transactional store operations, but not at non-transactional load operations. Therefore, in block 420 it is determined if the non-transactional memory access is a load or store. Here, a compiler inserts write barriers at non-transactional store operations that reference the data element, but not at previously encountered non-transactional read operations that reference the data element. Once again, a list of the previously encountered non-transactional read/store operations may be held in an entry of a table associated with the data element.

FIG. 5a illustrates an embodiment of a flowchart for a method of optimizing barriers in a strong atomicity transactional memory system utilizing a global memory access table. In one embodiment, a global memory access table is maintained during runtime compilation of code to determine if non-transactional memory access operations should include transactional barriers for strong atomicity.

In block 505 a non-transactional memory access to a data element is encountered. As an example, during runtime compilation of dynamic language code, the non-transactional memory access is encountered, such as during a linear or other scan of the code. As stated above, common examples of data elements for dynamic language code include a class, a type, an object and a field of an object. However, any granularity of data or memory location may be utilized as the herein referred to "data element" in determining potential conflicting accesses to the same data element.

In decision block 510, it is determined if an entry in a global access table for the data element already exists. For example, the global access table may be searchable by a reference to the data element, i.e. the global table is indexed by the referenced data element. Note that any known methods of indexing the table and searching the table may be utilized. If no entry already exists for the data element, then in block 515 an entry is updated to hold a reference to the data element. Here, updating an entry may include creating an entry in the table. Also, any known reference to indicate a data element, such as a class, type, object, field, cache line, or other known data element may be utilized.

Furthermore, in one embodiment, a transaction access state associated with the data element in the entry is, by default, updated to a "not accessed" state or value in block 520. Note that to reach block 520 no transactional or non-transactional access to the data element has been encountered, as there is no entry in the table for the data element. As a result, the state of the data element is set to "not accessed" in response to encountering the first access, which is a non-transactional access, to the data element.

Also, in one embodiment, the entry is updated to include a reference to the non-transactional memory access. Here, the entry potentially holds a list of previously encountered non-transactional memory accesses where no barrier was inserted or a lightweight barrier was inserted. As a result, when encountering the first access to a data element, which is a non-transactional access, the non-transactional access, in this case, is added to the entry in case a conflicting transactional memory access is later encountered.

In one embodiment, a reference to the non-transactional memory access includes a reference that identifies the memory access individually. In another embodiment, the reference includes a reference to an inclusive structure, such as a method that includes the non-transactional memory access.

As alluded to above, in one embodiment, in response to determining a full read or write barrier is not to be inserted at a non-transactional memory access, no barrier is inserted at the access. Alternatively, in another embodiment, in response to determining a full read or write barrier is not to be inserted at a non-transactional memory access, a lightweight barrier is inserted at the non-transactional memory access. Here, the lightweight barrier may later be disregarded, executed with less overhead than a full barrier, or patched/transitioned to a full barrier in response to encountering a conflicting transactional access, as discussed in more detail below.

Returning to decision block 510, when the table is searched, instead of not locating an entry and continuing on to block 515, in one embodiment, an entry is found that is associated with the data element. In other words, the global table is searched and an entry associated with the data element exists. If an entry is located, then it is determined if the entry indicates a conflicting transactional access. In one embodiment, which is not illustrated, if the entry indicates a transactional access to the data element has been detected, then a conflict is determined and appropriate barriers are inserted.

Alternatively, in another embodiment, insertion of a barrier depends on a transactional access state associated with the data element in the located entry of the table. As a result, in decision block 525, a transactional access state associated with the data element in the located entry is checked. Here, if the transactional access state represents a "read/write" state, i.e. the data element is written to and potentially read within a transaction, then a conflict is detected. Consequently, the appropriate barrier is inserted in block 530. For example, if the non-transactional memory access includes a load operation, then a read barrier is generated at the non-transactional memory access. Alternatively, if the non-transactional memory access includes a store operation, then a write barrier is generated at the non-transactional memory access However, if the transactional access state represents a "read" state, i.e. the data element is read and not written to in a transaction, then, in one embodiment, insertion of a transactional barrier depends on the type of non-transactional memory access. Therefore, in block 540 it is determined if the non-transactional memory access includes a store operation. If the non-transactional access includes a store, then a write barrier is inserted/generated at block 530.

In contrast, if the non-transactional memory access includes a load operation, then a reference to the non-transactional memory access is appended to any references held in the entry. As stated above, instead of generating no barrier, a lightweight barrier may be inserted here. In other words, the current transactional access state is a read only, which does not conflict with a non-transactional load. However, later if a transactional store is encountered and the access state is updated to read/write, then the reference to the non-transactional load operation is utilized to insert a barrier, as described below.

Returning to block 535, if the transactional access state does not include a read/write state or a read state, then it is determined that the transactional access state includes a not-accessed state. Here, no barrier or a lightweight barrier is inserted and the reference is added to the entry in block 545, as discussed above. Essentially, an entry has been encountered in the not-accessed state, which typically means that a previous non-transactional access has been encountered, but no transactional access has been encountered. Consequently, the reference is appended in the entry in block 545 to ensure an appropriate barrier is inserted at the non-transactional access in response to subsequently encountering a conflicting transactional access.

Referring to FIG. 5b, another embodiment of a flowchart for a method of optimizing barriers in a strong atomicity transactional memory system utilizing a global memory access table is illustrated. A transactional memory access operation referencing a data element is encountered or detected in block 550 in a similar manner to encountering the non-transactional access in block 505 of FIG. 5a. In one embodiment, the global access table is searched/checked, as described above, in decision block 555 to determine if an entry associated with the referenced data element exists.

In one embodiment, if no entry exists, then an entry is created/updated to hold the referenced data element and the appropriate transaction access state as described in blocks 560-570. In one embodiment, which is not illustrated, the access state includes an access or not accessed state. Here, a transactional access and a non-transactional access are determined to be potentially conflicting, and no delineation between stores and loads are made. However, in an alternate embodiment, the transaction access state is updated to a read/write state if the transactional access includes a transactional store operation, and the transactional access state is updated to a read state if the transactional access includes a read state. In either case, an identifier field to hold a method or other reference to a non-transactional memory access may be left blank or unmodified.

Returning to decision block 555, if an entry does exists for the data element, then in decision block 570 it is determined if the transactional memory access operation includes a load or store operation. If the transactional access includes a store operation, then in block 595 the transaction access state of the entry is updated to a read-write state. In one embodiment, a read-write state is to indicate that an associated data element or memory location is to be at least written to in a transaction and may also be read in the transaction. In response to the transaction state being updated to the read/write state, then read and write barriers are inserted at previously encountered non-transactional memory access operations in block 590. Note from above, that these previously encountered non-transactional operations are referenced in the entry.

In contrast, if the transactional access includes a load operation to read the data element, then at block 575 the transaction access state is updated to a read only state. Here, the read only state indicates that a data element or memory location is to be read in a transaction, but not written to in a transaction. In decision block 580, after determining the transactional access includes a load operation, it is determined if a referenced non-transactional memory access includes a load or a store operation. If the non-transactional access includes a store operation, then a write barrier is inserted at the non-transactional store operation in block 590. However, in one embodiment, if the non-transactional access includes a load operation, then no barrier or a lightweight barrier is inserted at block 585.

Whether inserting a write barrier at non-transactional store operations listed in the entry in response to updating the transactional access state to a read state or inserting read and write barriers at non-transactional load and store operations listed in the entry in response to updating the transactional access state to a read/write state, inserting barriers at block 590 may be done by any known method. As a first example, when no access is inserted at a previously encountered non-transactional access listed in the entry, the code is patched to insert an appropriate barrier. Patching, as described above, in an illustrative example includes overwriting the access operation with a jump operation to direct flow to the barrier before performing the access operation. As a second example, instead of patching, the code is recompiled utilizing on-stack replacement to insert the barriers at the access operation.

In another embodiment, where a lightweight barrier or other space reserving operations are inserted at a previously encountered non-transactional access listed in the entry, patching is utilized to overwrite the lightweight barrier to a full barrier, i.e. transition of the lightweight barrier to a full barrier.

Therefore, whether a transactional or non-transactional memory access is encountered before the other, conflicting accesses may be detected and barriers may be selectively inserted at non-transactional memory operations that may potentially conflict with transactional memory operations, either at compilation of the non-transactional operation or later when the conflicting transactional access is detected.

Figure 6:
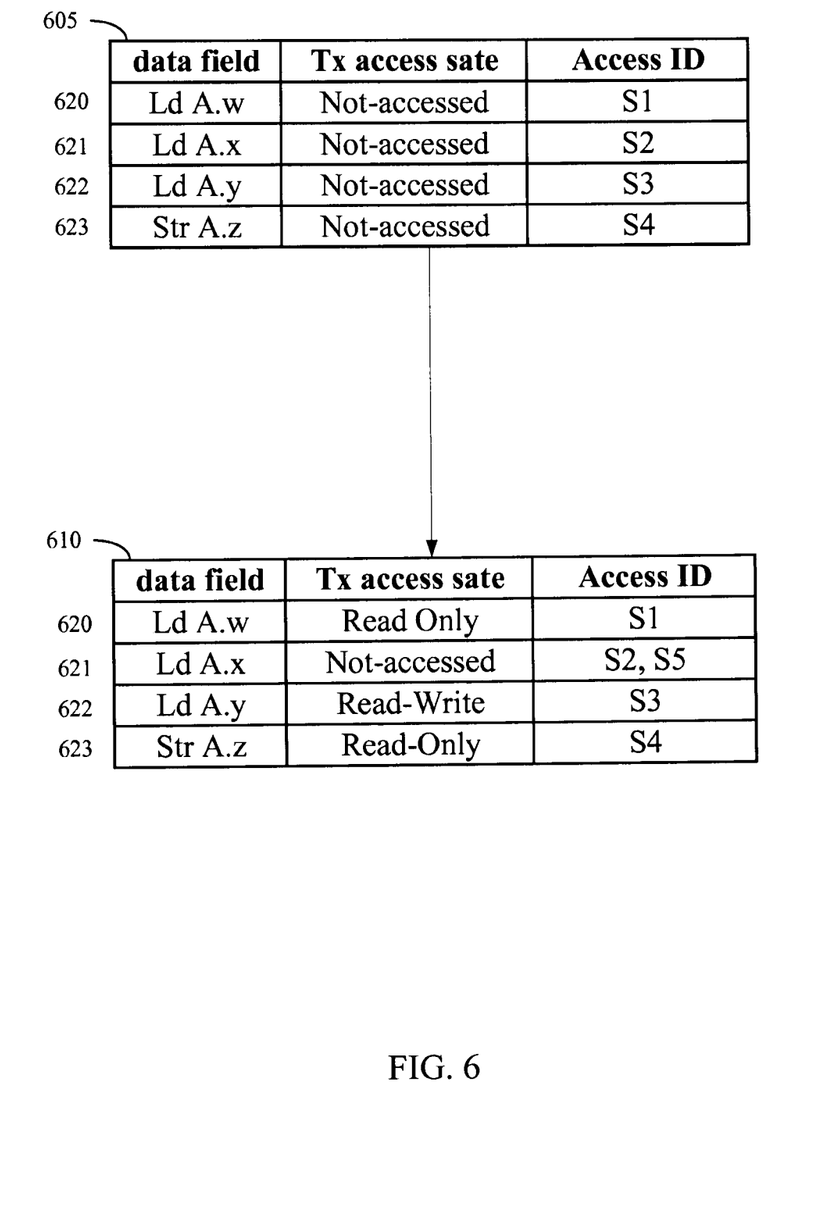
FIG. 6 illustrates an illustrative embodiment of an access table to support optimization of transactional barriers for exemplary code.

Turning to FIG. 6, an illustrative embodiment of an access table to support optimization of transactional barriers for exemplary code is illustrated.

Figure 6A:
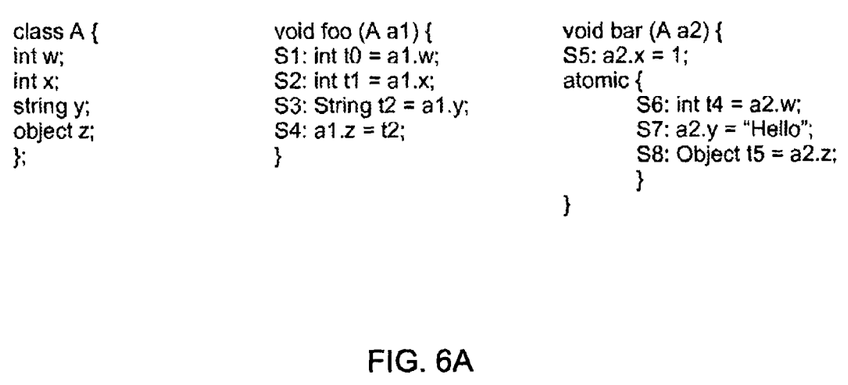
FIG. 6A illustrates an exemplary pseudo code for dynamic compilation.

As illustrated, table 605 includes an illustrative representation of a global memory access table after function foo from FIG. 6A is compiled, while table 610 includes an illustrative representation of table 605 after function bar from FIG. 6A has been compiled. Note that table 605 includes three fields: a data field, a transaction access state field, and an access ID field. As stated above, the data field may hold a reference to a data element, memory location, or other common reference between memory access operations.

In one embodiment, the transaction access state is either not-accessed to indicate no access within a transaction or accessed to indicate the referenced data is accessed in a transaction. In another embodiment, access states include not accessed (not accessed in a transaction), read only (only read in a transaction), and read-write (at least written to in a transaction). Furthermore, as stated above, the access ID field may hold a reference to individual non-transactional memory accesses or to methods including non-transactional accesses that are associated with the entries.

As an oversimplified illustrative example, the pseudo code of FIG. 6A is herein described in reference to FIG. 6. During dynamic compilation in this example, function foo is compiled before function bar. Upon encountering statement 1 (S1), entry 620 is created/updated to hold a reference to the data element, i.e. A::w, the transaction access state is updated to the default not-accessed state, and an access ID represented here as S1 is updated in the access ID field. The reference S1 is an illustrative representation of a reference to a single non-transactional operation. In another embodiment, a reference to the method foo, i.e. the method including statement 1, is updated in the access ID field.

Similarly, through compilation of method foo, entries 621-623, are updated in response to encountering statements S2, S3, and S4. Note, as no transactional access has been encountered, the transaction access state for each of the entries 620-623 is updated to not-accessed. Here, references to the individual non-transactional memory accesses are held in each access ID field, which are associated with references to the data to be accessed held in the data fields.

Next, the compiler begins to compile method bar and encounters statement 5 (S5), a non-transactional write to field x of class A. Here, there is no transactional access to field x, so the transaction access state of entry 621 is not modified. However, the access ID field is updated to also include a reference to S5. As a result, upon encountering a subsequent transactional conflicting access, an accurate record of accesses (S2 and S5) and/or methods to patch are held in the access ID field of entry 621.

Statement S6 of method bar is then encountered, which includes a transactional read of the field w of class/type A2. In other words, a transactional load operation from field w is encountered. The global table is searched and entry 620 is found, which corresponds to field w of class A. As the transactional access includes a load, the transaction access state of entry 620 is updated to a read-only state. Similarly, in response to statements S7 and S8, transaction access states of entries 622 and 623 are updated to read-write and read-only, respectively, as statement S7 includes a write to field A::y and statement S8 includes a read from field A::z.

In one embodiment, a compiler enumerates through table 610 to determine which entries include accesses and/or methods to be patched. Entry 621 includes a not-accessed access state, so no barriers are inserted at operations S2 and S5. Entry 620 includes a read-only transaction access state, therefore, in one embodiment, write barriers are to be inserted at any referenced non-transactional store operations. Here, only a load, i.e. S1, is referenced in the access ID field, so no barrier is to be inserted. However, note if only the method foo were referenced in the access ID field, then write barriers would be inserted at the store operations, i.e. S4.

Similarly, entry 623 includes the read-only access state, so write barriers are inserted at the non-transactional store operation S4. Furthermore, entry 622 includes a read-write access state. As a result, read and write barriers are to be appropriately inserted. Here, S3 includes a load operation, so a read barrier is inserted accordingly. Note that insertion of barriers may be done by any known method, such as the methods described above.

Therefore, as can be seen from above, barrier overhead for strong atomicity may be optimized. Previously, weakly atomic systems provided efficient execution, but potentially incurred risks of inaccurate execution due to conflicts between non-transactional and transactional memory accesses. Furthermore, fully strong atomic systems without optimization incur significant overhead at non-transactional accesses. As a result, during dynamic compilation barriers may be inserted at non-transactional operations that potentially conflict with transactional accesses, while barriers may also be omitted from non-transactional accesses that do not potentially conflict with transactional accesses. This optimized removal/omission of barriers provides the advantages of a strong atomic system, i.e. isolation between non-transactional and transactional memory accesses that require isolation, while also providing the advantage of a weakly atomic system, i.e. efficient execution overhead for non-transactional accesses that do not require isolation.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A tangible machine readable storage medium comprising instructions that, when executed, cause a machine to, at least:
   identify a transactional memory access operation referenced by a non-transactional memory access operation;
   determine whether the transactional memory access operation is associated with a transactional store operation or a transactional load operation;
   insert a first transactional barrier when the transactional memory access operation is associated with the transactional store operation;
   identifying whether the non-transactional memory access operation is associated with a non-transactional load operation or a non-transactional store operation when the transactional memory access operation is associated with the transactional load operation; and
   inserting a second transactional barrier when the non-transactional memory access is a non-transactional store operation, and preventing insertion of the second transactional barrier when the non-transactional memory access is a non-transactional load operation.

2. A machine readable storage medium as defined in claim 1, wherein the instructions, when executed, further cause the machine to insert the first or second transactional barriers by generating the first or second transactional barriers during compilation in response to encountering the transactional memory access operation before the non-transactional memory access operation.

3. A machine readable storage medium as defined in claim 1, wherein the instructions, when executed, further cause the machine to insert the first transactional barrier by overwriting the non-transactional memory access operation with a jump operation, when executed, to direct execution flow to the first transactional barrier and a copy of the non-transactional memory access operation in response to encountering the transactional memory access operation after encountering the non-transactional memory access operation during compilation.

4. A machine readable storage medium as defined in claim 1, wherein the instructions, when executed, further cause the machine to insert the first transactional barrier by overwriting a lightweight barrier previously inserted at the non-transactional memory access to direct execution flow to the first transactional barrier in response to encountering the transactional memory access operation after encountering the non-transactional memory access operation during compilation.

5. A machine readable storage medium as defined in claim 1, wherein the non-transactional memory access operation includes a non-transactional load operation to read from a memory location, and wherein the instructions, when executed, further cause the machine to determine whether the non-transactional load operation is to potentially conflict with a transactional memory access operation by determining whether the transactional memory access operation includes a transactional store operation that references the memory location during runtime compilation of code that includes the transactional memory access operation.

6. A machine readable storage medium as defined in claim 1, wherein the instructions, when executed, further cause the machine to:
   write the non-transactional store operation to a memory location; and
   determine whether the non-transactional store operation is to potentially conflict with a transactional memory access operation by determining whether the transactional memory access operation that references the memory location during runtime compilation of code includes the transactional memory access operation.

7. A machine readable storage medium as defined in claim 1, wherein the instructions, when executed, further cause the machine to determine whether a non-transactional memory access operation is to potentially conflict with a transactional memory access operation by determining whether a data element referenced by the non-transactional memory access operation is conflictingly referenced by the transactional memory access operation during runtime compilation of code.

8. A machine readable storage medium as defined in claim 7, wherein the code includes compiled dynamic language code, and wherein the data element includes a field or an array element of a type in the dynamic language code.

9. A machine readable storage medium as defined in claim 7, wherein the instructions, when executed, further cause the machine to:
   in response to encountering the non-transactional memory access operation, update a data field of an entry of a memory access table to hold a reference to the data object and update an access identification (ID) field of the entry to reference the non-transactional memory access operation;
   update an access state field of the entry to a read only state responsive to encountering the transactional memory access operation and the transactional memory access operation including a transactional load operation to read the data object; and
   update the access state field to a read-write state responsive to encountering the transactional memory access and the transactional memory access operation including a transactional store operation to write to the data object.

10. A machine readable storage medium as defined in claim 9, wherein the instructions, when executed, further cause the machine to:
    include a non-transactional load operation to read the data object; and
    determine whether the data object referenced by the non-transactional load operation is conflictingly referenced by the transactional memory access operation in response to the transactional access state field being updated to the read-write state.

11. A machine readable storage medium as defined in claim 10, wherein the instructions, when executed, further cause the machine to insert the second transactional barrier via a read barrier at the non-transactional load operation in response to the transactional access state field being updated to the read-write state.

12. A machine readable storage medium as defined in claim 11, wherein the instructions, when executed, further cause the machine to determine whether the non-transactional load operation does not conflict with the transactional memory access operation in response to the transactional memory access operation including a transactional load to read the data object.

13. A machine readable storage medium as defined in claim 9, wherein the instructions, when executed, further cause the machine to:
include a non-transactional store operation to write to the data object; and
determine whether the data object referenced by the non-transactional store operation is conflictingly referenced by the transactional memory access operation in response to the transactional access state field being updated to at least one of the read-write state or the read only state.

14. A machine readable storage medium as defined in claim 13, wherein the instructions, when executed, further cause the machine to insert a write barrier at the non-transactional store operation in response to the transactional access state field being updated to at least one of the read-write state or the read only state.

15. A method comprising:
identifying a transactional memory access operation referenced by a non-transactional memory access operation;
determining during dynamic compilation of code whether the transactional memory access operation includes a transactional store memory operation or a transactional load operation;
inserting a first transactional barrier when the transactional memory access operation is a transactional store memory operation;
in response to determining that the transactional memory access operation is a transactional load operation, inserting a second transactional barrier when the non-transactional memory access operation is a non-transactional store operation; and
preventing insertion of the second transactional barrier when the non-transactional memory access operation is a non-transactional load operation.

16. The method of claim 15, further comprising checking a table for an entry associated with a data reference to determine whether the transactional memory access operation includes the data reference associated with the non-transactional memory access operation in response to finding the entry associated with the data reference in the table and the entry including a reference to the non-transactional memory access operation.

17. The method of claim 15, further comprising:
reserving space at the non-transactional memory access operation during dynamic compilation of the non-transactional memory access operation; and
patching the code to insert a call to the second transactional barrier at the non-transactional memory access after determining that the transactional memory access operation includes the data reference associated with the non-transactional memory access operation.

18. The method of claim 15, further comprising utilizing on-stack replacement to generate a new copy of the code including a call to the second transactional barrier at the non-transactional memory access operation.

19. A method comprising:
identifying a transactional memory access operation and referenced by a non-transactional memory access operation;
in response to encountering the non-transactional memory access operation referencing a data element, determining if an entry associated with the data element is included in a global table as one of a transactional store or a transactional load;
generating a first transactional barrier when the transactional memory access operation is a transactional store;
in response to determining that the data element in the global table is a transactional load, generating a second transactional barrier when the non-transactional memory access operation is a store; and
preventing generation of the second transactional barrier when the non-transactional memory access operation is a non-transactional load operation.

20. The method of claim 19, further comprising identifying a conflicting access state when at least one of a read/write access state is detected, or a read access state in response to the non-transactional memory access operation including a store operation is detected.

21. The method of claim 20 further comprising:
creating the entry associated with the data element in the global table;
updating the transaction access state held in the entry to a not-accessed state; and
updating an access identifier field of the entry to include a reference to the non-transactional memory access operation.

22. The method of claim 21, further comprising:
updating the transaction access state held in the entry to a read-write state and inserting an appropriate barrier at the non-transactional memory access operation in response to the transactional memory access operation including a transactional store operation and the access identifier field of the entry holding the reference to the non-transactional memory access operation; and
updating the transaction access state held in the entry to a read state and inserting an appropriate barrier at the non-transactional memory access operation in response to the transactional memory access operation including a transactional load operation, the non-transactional memory access operation including a non-transactional store operation, and the access identifier field of the entry holding the reference to the non-transactional store operation.

23. The method of claim 22, further comprising patching code including the non-transactional memory access operation to direct execution at the non-transactional memory access operation to the appropriate barrier.

24. The method of claim 22, further comprising recompiling code including the non-transactional memory access operation to include the appropriate barrier at the non-transactional memory access operation.

* * * * *

UNITED STATES PATENT AND TRADEMARK OFFICE
CERTIFICATE OF CORRECTION

PATENT NO. : 8,612,950 B2  Page 1 of 1
APPLICATION NO. : 12/142102
DATED : December 17, 2013
INVENTOR(S) : Shpeisman et al.

It is certified that error appears in the above-identified patent and that said Letters Patent is hereby corrected as shown below:

In the Claims:
Claim 3, Column 17, line 48:
Delete "when executed,"

Signed and Sealed this
Twentieth Day of May, 2014

Michelle K. Lee
*Deputy Director of the United States Patent and Trademark Office*